US012322542B2

(12) United States Patent
Ito et al.

(10) Patent No.: US 12,322,542 B2
(45) **Date of Patent: *Jun. 3, 2025**

(54) RARE EARTH MAGNET AND PRODUCTION METHOD THEREOF

(71) Applicants: TOYOTA JIDOSHA KABUSHIKI KAISHA, Toyota (JP); NICHIA CORPORATION, Anan (JP)

(72) Inventors: Masaaki Ito, Anjo (JP); Reimi Tabuchi, Nisshin (JP); Motoki Hiraoka, Toyota (JP); Hisashi Maehara, Itano-gun (JP)

(73) Assignees: TOYOTA JIDOSHA KABUSHIKI KAISHA, Toyota (JP); NICHIA CORPORATION, Anan (JP)

( * ) Notice: Subject to any disclaimer, the term of this patent is extended or adjusted under 35 U.S.C. 154(b) by 222 days.

This patent is subject to a terminal disclaimer.

(21) Appl. No.: 17/986,179

(22) Filed: Nov. 14, 2022

(65) Prior Publication Data

US 2023/0162913 A1 May 25, 2023

(30) Foreign Application Priority Data

Nov. 24, 2021 (JP) ................................ 2021-190550

(51) Int. Cl.
*H01F 41/02* (2006.01)
*B22F 1/00* (2022.01)
(Continued)

(52) U.S. Cl.
CPC ............ *H01F 41/0266* (2013.01); *B22F 1/09* (2022.01); *B22F 3/16* (2013.01); *B22F 3/24* (2013.01);
(Continued)

(58) Field of Classification Search
CPC ....... H01F 1/059–0596; H01F 41/0253; B22F 1/09; B22F 1/17
(Continued)

(56) References Cited

U.S. PATENT DOCUMENTS

2010/0261038 A1* 10/2010 Imaoka .................... B22F 1/16 427/127
2017/0186519 A1 6/2017 Maehara
(Continued)

FOREIGN PATENT DOCUMENTS

EP 3343572 A1 7/2018
JP H04-354104 A 12/1992
(Continued)

OTHER PUBLICATIONS

Matsura M., et al.; "Microstructural changes in high-coercivity Zn-bonded Sm—Fe—N magnets", J. of Magnetism and Magnetic Materials; 540, 2020 (Year: 2020).*
(Continued)

*Primary Examiner* — Alexandra M Moore
*Assistant Examiner* — Austin Pollock
(74) *Attorney, Agent, or Firm* — Oliff PLC

(57) ABSTRACT

A Sm—Fe—N-based rare earth magnet more resistant to demagnetization than ever before, particularly at high temperatures, and a production method thereof are provided. The present disclosure presents a production method of a rare earth magnet, including mixing a SmFeN magnetic powder and a modifier powder to obtain a mixed powder, compression-molding the mixed powder in a magnetic field to obtain a magnetic-field molded body, pressure-sintering the magnetic-field molded body to obtain a sintered body, and heat-treating the sintered body, and a rare earth magnet obtained by the method. $D_{50}$ of the magnetic powder is 1.50 μm or more and 3.00 μm or less, the content ratio of the zinc
(Continued)

component in the modifier powder is 6 mass % or more and 30 mass % or less, and the heat treatment temperature is 350° C. or more and 410° C. or less.

6 Claims, 3 Drawing Sheets

(51) Int. Cl.
*B22F 3/16* (2006.01)
*B22F 3/24* (2006.01)
*C22C 38/00* (2006.01)
*H01F 1/059* (2006.01)

(52) U.S. Cl.
CPC .......... *C22C 38/001* (2013.01); *C22C 38/005* (2013.01); *H01F 1/059* (2013.01); *H01F 1/0596* (2013.01); *H01F 41/0253* (2013.01); *H01F 41/0273* (2013.01); *B22F 2003/248* (2013.01); *B22F 2301/355* (2013.01); *B22F 2304/10* (2013.01); *C22C 2202/02* (2013.01)

(58) Field of Classification Search
USPC .......................................................... 148/104
See application file for complete search history.

(56) References Cited

U.S. PATENT DOCUMENTS

| | | | |
|---|---|---|---|
| 2018/0226180 A1 | 8/2018 | Kawashita et al. | |
| 2020/0098496 A1* | 3/2020 | Kinoshita | H01F 41/0266 |
| 2020/0098497 A1* | 3/2020 | Sakuma | C22C 1/0433 |
| 2021/0272751 A1 | 9/2021 | Ichigozaki et al. | |
| 2022/0199321 A1 | 6/2022 | Ito et al. | |
| 2022/0246336 A1 | 8/2022 | Ichigozaki et al. | |
| 2023/0039058 A1 | 2/2023 | Yokota et al. | |

FOREIGN PATENT DOCUMENTS

| | | | |
|---|---|---|---|
| JP | H04350903 | A | 12/1992 |
| JP | H06-020815 | A | 1/1994 |
| JP | 2002-043110 | A | 2/2002 |
| JP | 2015-201628 | A | 11/2015 |
| JP | 2017-117937 | A | 6/2017 |
| JP | 2019-012796 | A | 1/2019 |
| JP | 2019012811 | A | 1/2019 |
| JP | 2020-050892 | A | 4/2020 |
| JP | 2020-53440 | | 4/2020 |
| JP | 2020-057644 | A | 4/2020 |
| JP | 2020-057645 | A | 4/2020 |
| JP | 2020-057646 | A | 4/2020 |
| JP | 2020-102606 | A | 7/2020 |
| JP | 2020-155545 | A | 9/2020 |
| JP | 2020-155740 | A | 9/2020 |
| JP | 2020-161704 | A | 10/2020 |
| JP | 2021-052111 | A | 4/2021 |
| JP | 2021-136347 | A | 9/2021 |
| JP | 2022-096382 | A | 6/2022 |
| WO | 2015/199096 | A1 | 12/2015 |

OTHER PUBLICATIONS

Matsura M. et al.; "High coercive Zn-bonded Sm—Fe—N magnets prepared using fine Zn particles with low oxygen content"; Journal of Magnetism and Magnetic Materials 452 (2018) 243-248 (Year: 2018).*

Hiraga K., et al.; "Microstructure of Zinc-Bonded Sm2Fe17N3 Permanent Magnet Studied by Transmission and Analytical Electron Microscopy", Materials Transactions; JIM, vol. 34, No. 6, 1993, pp. 569-582 (Year: 1993).*

O'Donnell C., et al.; "Pressure-assisted zinc bonding of microcrystalline Sm, Fe17N, powders", Appl. Phys Lett, 60, 26, 1992 (Year: 1992).*

Sep. 29, 2024 Notice of Allowance issued in U.S. Appl. No. 17/539,491.

Prabhu, D. et al., "Enhanced coercivity of spark plasma sintered Zn-bonded Sm—Fe—N magnets," Scripta Materialia, vol. 67, pp. 153-156, 2012.

Takagi, K. et al., "Fabrication of Zn/Sm2Fe17N3 Sintered Magnets by High-Pressure Current Sintering," J. Jpn. Soc. Powder Powder Metallurgy, vol. 59, No. 9., pp. 564-569.

Oct. 12, 2023 Office Action issued in U.S. Appl. No. 17/978,688.

Feb. 20, 2024 Notice of Allowance issued in U.S. Appl. No. 17/978,688.

May 19, 2023 Office Action issued in U.S. Appl. No. 17/986,366.

Dec. 6, 2023 Office Action issued in U.S. Appl. No. 17/986,366.

Oct. 25, 2024 Notice of Allowance issued in U.S. Appl. No. 17/986,366.

* cited by examiner

RARE EARTH MAGNET AND PRODUCTION METHOD THEREOF

FIELD

The present disclosure relates to a rare earth magnet and a production method thereof. More specifically, the present disclosure relates to a rare earth magnet having a magnetic phase which contains Sm, Fe and N and at least partially has a crystal structure of either $Th_2Zn_{17}$ type or $Th_2Ni_{17}$ type, and a production method thereof.

BACKGROUND

As a high-performance rare earth magnet, a Sm—Co-based rare earth magnet and a Nd—Fe—B-based rare earth magnet have been put into practical use, but recently, rare earth magnets other than these are studied.

For example, a rare earth magnet containing Sm, Fe and N (hereinafter, sometimes referred to as "Sm—Fe—N-based rare earth magnet") is being studied. The Sm—Fe—N-based rare earth magnet is produced, for example, using a magnetic powder containing Sm, Fe and N (hereinafter, sometimes referred to as "SmFeN powder").

The SmFeN powder has a magnetic phase having a crystal structure of either $Th_2Zn_{17}$ type or $Th_2Ni_{17}$ type. In this magnetic phase, N is considered as forming an interstitial solid solution in a Sm—Fe crystal. Consequently, N is likely to dissociate with heat to cause decomposition of the SmFeN powder. For this reason, the Sm—Fe—N-based rare earth magnet is often produced by molding a SmFeN powder with use of a resin and/or rubber, etc.

Other methods for producing a Sm—Fe—N-based rare earth magnet include, for example, a production method disclosed in Patent Literature 1. In this production method, a SmFeN powder and a powder containing metallic zinc (hereinafter, sometimes referred to as "metallic zinc powder") are mixed, the mixed powder is molded in a magnetic field, and the magnetic-field molded body is sintered (including liquid phase sintering). In addition, Patent Literature 2 discloses a production method of a rare earth magnet, where a SmFeN powder having a surface coated with a zinc component is molded in a magnetic field and the magnetic-field molded body is sintered.

The production method of a SmFeN powder is disclosed, for example, in Patent Literatures 3 and 4.

CITATION LIST

Patent Literature

[PTL 1] International Publication WO 2015/199096 A1
[PTL 2] Japanese Unexamined Patent Publication JP 2020-161704 A
[PTL 3] Japanese Unexamined Patent Publication JP 2017-117937 A
[PTL 4] Japanese Unexamined Patent Publication JP 2020-102606 A

SUMMARY

Technical Problem

The method for sintering the magnetic-field molded body is roughly divided into a pressureless sintering method and a pressure sintering method. In either sintering method, a high-density rare earth magnet (sintered body) is obtained by sintering the magnetic-field molded body. In the pressureless sintering method, a pressure is not applied to the magnetic-field molded body during sintering, and therefore, in order to obtain a high-density sintered body, the magnetic-field molded body is generally sintered at a high temperature of 900° C. or more for a long time of 6 hours or more. On the other hand, in the pressure sintering method, since a pressure is applied to the magnetic-field molded body during sintering, a high-density sintered body is generally obtained even when the magnetic-field molded body is sintered at a low temperature of 600 to 800° C. for a short time of 0.1 to 5 hours.

In the case of sintering a magnetic-field molded body of a mixed powder of SmFeN powder and metallic zinc powder, pressure sintering is employed so as to avoid decomposition of the SmFeN powder due to heat, and the sintering is performed at a lower sintering temperature for a shorter time than in the normal pressure sintering. The reason why sintering is possible even at such a low temperature and a short time is because the zinc component in the metallic zinc powder diffuses to the magnetic powder surface during sintering and is sintered (solidified). In this way, the metallic zinc powder in the magnetic-field molded body has a function as a binder. In addition, the metallic zinc powder in the magnetic-field molded body also has a function as a modifier that modifies an a-Fe phase in the SmFeN powder as well as absorbs oxygen in the SmFeN powder to enhance the coercive force. Hereinafter, a powder having both a function as a 2) binder and a function as a modifier, which is used at the time of manufacture of a Sm—Fe—N-based rare earth magnet, is sometimes referred to as "modifier powder".

In the case where a permanent magnet including a Sm—Fe—N-based rare earth magnet is used for motors, the permanent magnet is disposed in a periodically changing external magnetic field environment. The permanent magnet is therefore affected by the external magnetic field. This is described by referring to drawings.

FIG. 1 is an explanatory diagram schematically illustrating a demagnetization curve of an ideal permanent magnet. $B_r$ denotes a residual magnetic flux density, and $H_c$ denotes a coercive force. The permanent magnet in a motor is used under an external magnetic field environment in the range indicated by the "motor operation region" in FIG. 1 (the range surrounded by a broken line of FIG. 1). In the motor operation region, the magnet is affected by the magnetic field on the stator. In the case of an ideal permanent magnet, magnetization is not reduced by the external magnetic field in the motor operation region. However, in the case of a practical permanent magnet, magnetization is reduced by the external magnetic field in the motor operation region.

FIG. 2 is an explanatory diagram schematically illustrating demagnetization curves of a Sm—Fe—N-based rare earth magnet and a Nd—Fe—B-based rare earth magnet. The broken line shows the motor operation region. As illustrated in FIG. 2, compared with the Nd—Fe—B-based rare earth magnet, in the Sm—Fe—N-based rare earth magnet, the coercive force ($H_c$) is large, but the magnetization reduction (demagnetization) is large in the motor operation region relative to the external magnetic field. If the magnetization reduction (demagnetization) is large in the motor operation region relative to the external magnetic field, current control of the motor on the stator side is complicated, increasing the load on an inverter connected to the motor. In order to lessen the load of an inverter, an inverter with high capacity is needed, which impairs the economy.

This is prominent when the motor is operated with a high output power and the permanent magnet in the motor is subjected to high temperatures. Incidentally, in the present description, unless otherwise indicated, regarding the magnetic properties, the “high temperature” means from 100 to 200° C.

From these, the present inventors have discovered the problem that a Sm—Fe—N-based rare earth magnet more resistant to demagnetization than ever before in the motor operation region, particularly at high temperatures, and a production method thereof are demanded.

The present disclosure has been made to solve the problem above. More specifically, an object of the present disclosure is to provide a Sm—Fe—N-based rare earth magnet more resistant to demagnetization than ever before in an environment where an external magnetic field is applied, particularly at high temperatures, and a production method thereof.

Solution to Problem

The present inventors have made many intensive studies to attain the object above and have accomplished the rare earth magnet of the present disclosure and a production method thereof.

The rare earth magnet of the present disclosure and a production method thereof include the following embodiments.

<1> A production method of a rare earth magnet, including:

- preparing a magnetic powder having a magnetic phase which contains Sm, Fe and N and at least partially has a crystal structure of either $Th_2Zn_{17}$ type or $Th_2Ni_{17}$ type,
- preparing a modifier powder containing at least either a metallic zinc or a zinc alloy,
- mixing the magnetic powder and the modifier powder to obtain a mixed powder,
- compression-molding the mixed powder in a magnetic field to obtain a magnetic-field molded body,
- pressure-sintering the magnetic-field molded body to obtain a sintered body, and
- heat-treating the sintered body, wherein
- $D_{50}$ of the magnetic powder is 1.50 μm or more and 3.00 μm or less,
- the content ratio of the zinc component in the modifier powder is 6 mass % or more and 30 mass % or less relative to the mixed powder, and
- the heat treatment is performed at 350° C. or more and 410° C. or less.

<2> The production method of a rare earth magnet according to item <1>, wherein in the magnetic powder, the proportion of magnetic powder particles having a particle diameter of 1.00 μm or less to the total number of magnetic powder particles of the magnetic powder is 1.50% or less and the content ratio of the zinc component in the modifier powder is 6 mass % or more and 10 mass % or less relative to the mixed powder.

<3> The production method of a rare earth magnet according to item <1> or <2>, wherein the sintered body is heat-treated until a Fe—Zn alloy phase is formed on 90% or more of the particle surface of the magnetic powder in the sintered body.

<4> The production method of a rare earth magnet according to any one of items <1> to <3>, wherein the heat treatment is performed at 350° C. or more and 400° C. or less.

<5> The production method of a rare earth magnet according to any one of items <1> to <4>, wherein the heat treatment is performed over 3 hours or more and 40 hours or less.

<6> The production method of a rare earth magnet according to any one of items <1> to <5>, wherein the magnetic-field molded body is pressure-sintered at a pressure of 200 MPa or more and 1,500 MPa or less and a temperature of 300° C. or more and 400° C. or less over 1 minute or more and 30 minutes or less.

<7> A rare earth magnet including a magnetic powder that is sintered together with a modifier powder containing at least either a metallic zinc or a zinc alloy, wherein

- the magnetic powder contains Sm, Fe and N,
- the magnetic powder at least partially has a crystal structure of either $Th_2Zn_{17}$ type or $Th_2Ni_{17}$ type,
- the rare earth magnet contains 6 mass % or more and 30 mass % or less of a zinc component,
- $D_{50}$ of the magnetic powder is 1.50 μm or more and 3.00 μm or less, and
- a Fe—Zn alloy phase is formed on 90% or more of the surface of the magnetic powder.

Advantageous Effects of Invention

According to the present disclosure, a sintered body using a magnetic powder having a predetermined particle diameter $D_{50}$ is heat-treated at a predetermined temperature, and a Sm—Fe—N-based rare earth magnet more resistant to demagnetization than ever before in an environment where an external magnetic field is applied, and a production method thereof can thereby be provided.

DESCRIPTION OF EMBODIMENTS

Embodiments of the rare earth magnet of the present disclosure and the production method thereof are described in detail below. Incidentally, the embodiments described below should not be construed to limit the rare earth magnet of the present disclosure and the production method thereof.

The reason why the rare earth magnet of the present disclosure is more resistant to demagnetization than ever before is described together with its production method by using the drawings.

The rare earth magnet of the present disclosure is obtained by sintering a mixed powder of SmFeN powder and modifier powder. When many of SmFeN powder particles have a single magnetic domain, a reduction in demagnetization can be suppressed. In the case where the SmFeN powder particle has multiple magnetic domains, a magnetic domain wall is present between a magnetic domain and a magnetic domain. When the SmFeN powder particle has multiple magnetic domains, the obtained rare earth magnet is easily demagnetized. For this reason, the magnetic powder particles should have a predetermined particle diameter or less so that many of magnetic powder particles can have a single magnetic domain.

Figure 1:
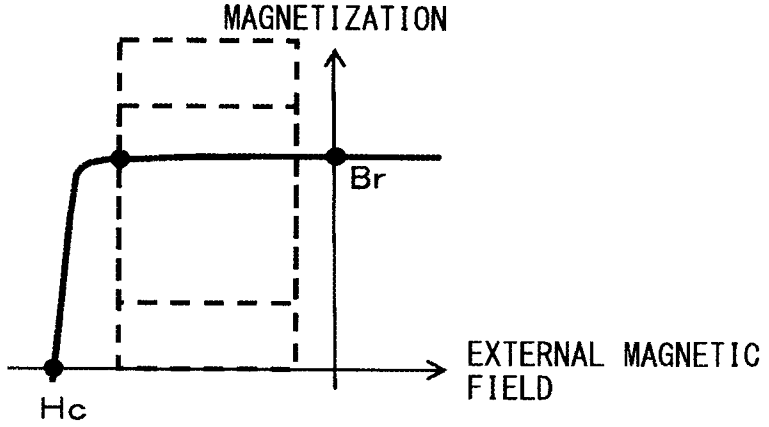
FIG. 1 is an explanatory diagram schematically illustrating the demagnetization curve of an ideal permanent magnet.
Figure 2:
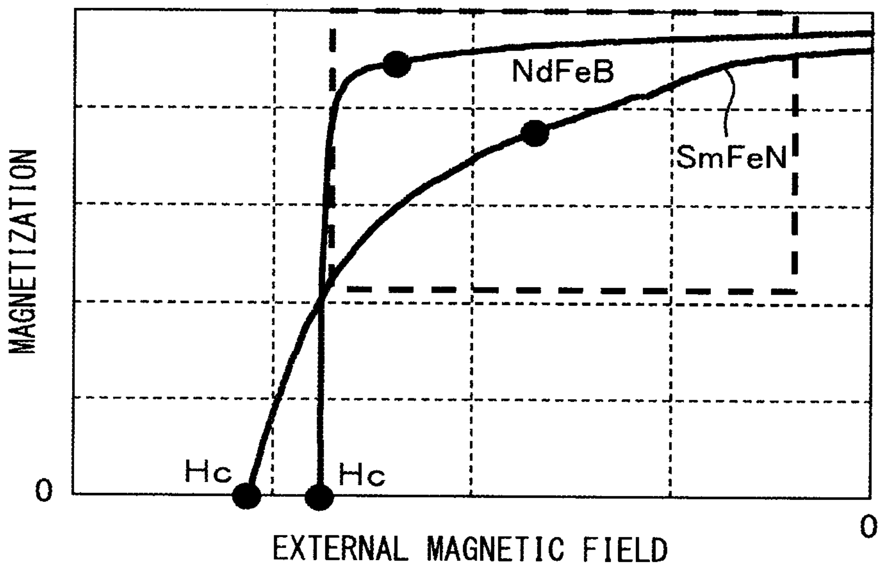
FIG. 2 is an explanatory diagram schematically illustrating the demagnetization curves of a Sm—Fe—N-based rare earth magnet and a Nd—Fe—B-based rare earth magnet.
Figure 3A:
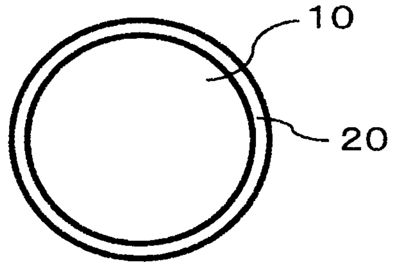
FIG. 3A is an explanatory diagram schematically illustrating a SmFeN powder particle on which surface a modified phase is thoroughly formed.
Figure 3B:
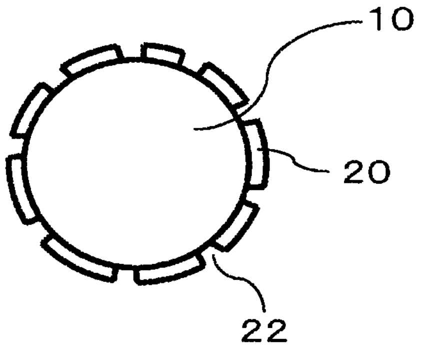
FIG. 3B is an explanatory diagram schematically illustrating a SmFeN particle on which surface a modified phase is not thoroughly formed.

Also, the surface of the SmFeN powder particle is likely to provide a starting point for magnetization reversal due to the presence of a-Fe phase having not contributed to the formation of the magnetic phase. In order to suppress providing the starting point, it is effective to modify the surface of the magnetic powder particle. FIG. 3A is an explanatory diagram schematically illustrating a SmFeN powder particle on which surface a modified phase is thoroughly formed. FIG. 3B is an explanatory diagram schematically illustrating a SmFeN particle on which surface a modified phase is not thoroughly formed.

As illustrated in FIG. 3A and FIG. 3B, the modified phase 20 is formed on the surface of the SmFeN powder particle 10. The modified phase 20 is a Fe—Zn alloy phase formed by alloying between a-Fe phase present on the surface of the SmFeN powder particle 10 and Zn of the modifier. While the a-Fe phase is a soft magnetic phase, the Fe—Zn alloy phase is a non-magnetic phase, and therefore can avoid providing a starting point for magnetization reversal, as a result, demagnetization can be suppressed.

As illustrated in FIG. 3A, when a modified phase 20 is thoroughly formed on the surface of the SmFeN powder particle 10 and the modified phase 20 covers the surface of the SmFeN powder particle 10 at not less than a predetermined coverage rate, demagnetization can be satisfactorily suppressed. On the other hand, as illustrated in FIG. 3B, when a modified phase 20 is not thoroughly formed on the surface of the SmFeN powder particle 10 and the modified phase 20 covers the surface of the SmFeN powder particle 10 only at less than a predetermined coverage rate, demagnetization cannot be sufficiently suppressed. This is because, as illustrated in FIG. 3B, a gap 22 is present in part of the modified phase 20 and in the gap 22 portion, the surface of the SmFeN powder particle 10 is exposed in the unmodified state.

The modified phase 20 illustrated in FIG. 3A is obtained by heat-treating a sintered body of a mixed powder of SmFeN powder and modifier powder under predetermined conditions.

The constituent features of the rare earth magnet of the present disclosure and the production method thereof, accomplished based on the knowledge, etc. discussed hereinabove, are described below.

<<Production Method of Rare Earth Magnet>>

A production method of the rare earth magnet of the present disclosure (hereinafter, sometimes simply referred to as "production method of the present disclosure) includes a magnetic powder preparation step, a modifier powder preparation step, a mixing step, a magnetic-field molding step, a pressure sintering step, and a heat treatment step. Each step is described below.

<Magnetic Powder Preparation Step>

A magnetic powder (SmFeN powder) is prepared. The magnetic powder (SmFeN powder) for use in the production method of the present disclosure is not particularly limited as long as it has a magnetic phase containing Sm, Fe and N and at least partially having a crystal structure of either $Th_2Zn_{17}$ type or $Th_2Ni_{17}$ type. The crystal structure of the magnetic phase includes a phase having a $TbCu_7$-type crystal structure, etc., in addition to the above-described structures. Note that Sm is samarium, Fe is iron, and N is nitrogen. Also, Th is thorium, Zn is zinc, Ni is nickel, Tb is terbium, and Cu is copper.

The SmFeN powder may include, for example, a magnetic phase represented by composition formula $(Sm_{(1-i)}R_i)_2(Fe_{(1-j)}Co_j)_{17}N_h$. The rare earth magnet (hereinafter, sometimes referred to as a "product") obtained by the production method of the present disclosure develops magnetization derived from the magnetic phase in the SmFeN powder. Here, the terms of i, j, and h denote the molar ratios.

The magnetic phase in the SmFeN powder may contain R within a range not impairing the effects of the production method of the present disclosure and the magnetic properties of the product. This range is represented by the term i in the composition formula above. The term i may be, for example, 0 or more, 0.10 or more, or 0.20 or more, and may be 0.50 or less, 0.40 or less, or 0.30 or less. R is one or more selected from rare earth elements other than Sm, and Zr. In the present description, the rare earth elements are Sc, Y, La, Ce, Pr, Nd, Pm, Sm, Eu, Gd, Tb, Dy, Ho, Er, Tm, Yb, and Lu. Incidentally, Zr is zirconium, Sc is scandium, Y is yttrium, La is lanthanum, Ce is cerium, Pr is praseodymium, Nd is neodymium, Pm is promethium, Sm is samarium, Eu is europium, Gd is gadolinium, Tb is terbium, Dy is dysprosium, Ho is holmium, Er is erbium, Tm is thulium, Yb is ytterbium, and Lu is lutetium.

With respect to $(Sm_{(1-i)}R_i)_2(Fe_{(1-j)}Co_j)_{17}N_h$, typically, R is substituted at the position of Sm in $Sm_2(Fe_{(1-j)}Co_j)_{17}N_h$, but the configuration is not limited thereto. For example, part of R may be interstitially disposed in $Sm_2(Fe_{(1-j)}Co_j)_{17}N_h$.

The magnetic phase in the SmFeN powder may contain Co within a range not impairing the effects of the production method of the present disclosure and the magnetic properties of the product. This range is represented by j in the composition formula above. The term j may be 0 or more, 0.10 or more, or 0.20 or more, and may be 0.52 or less, 0.50 or less, 0.40 or less, or 0.30 or less.

With respect to $(Sm_{(1-i)}R_i)_2(Fe_{(1-j)}Co_j)_{17}N_h$, typically, Co is substituted at the position of Fe of $(Sm_{(1-i)}R_i)_2Fe_{17}N_h$, but the configuration is not limited thereto. For example, part of Co may be interstitially disposed in $(Sm_{(1-i)}R_i)_2Fe_{17}N_h$.

N interstitially exists in the crystal grain represented by $(Sm_{(1-i)}R_i)_2(Fe_{(1-j)}Co_j)_{17}$, and the magnetic phase in the SmFeN powder thereby contributes to the development and enhancement of the magnetic properties.

With respect to $(Sm_{(1-i)}R_i)_2Fe_{17}N_h$, h may be from 1.5 to 4.5, but typically, the configuration is $(Sm_{(1-i)}R_i)_2Fe_{17}N_3$. The term h may be 1.8 or more, 2.0 or more, or 2.5 or more, and may be 4.2 or less, 4.0 or less, or 3.5 or less. The content of $(Sm_{(1-i)}R_i)_2Fe_{17}N_3$ relative to the entire $(Sm_{(1-i)}R_i)_2Fe_{17}N_h$ is preferably 70 mass % or more, more preferably 80 mass % or more, still more preferably 90 mass %. On the other hand, $(Sm_{(1-i)}R_i)_2Fe_{17}N_h$ need not entirely be $(Sm_{(1-i)}R_i)_2Fe_{17}N_3$. The content of $(Sm_{(1-i)}R_i)_2Fe_{17}N_3$ relative to the entire $(Sm_{(1-i)}R_i)_2Fe_{17}N_h$ may be 98 mass % or less, 95 mass % or less, or 92 mass % or less.

The SmFeN powder may contain, in addition to the magnetic phase represented by $(Sm_{(1-i)}R_i)_2Fe_{17}N_h$, oxygen and M as well as unavoidable impurity elements within a range substantially not impairing the effects of the production method of the present disclosure and the magnetic properties of the product. From the viewpoint of ensuring the magnetic properties of the product, the content of the magnetic phase represented by $(Sm_{(1-i)}R_i)_2Fe_{17}N_h$ relative to the entire SmFeN powder may be 80 mass % or more, 85 mass % or more, or 90 mass % or more. On the other hand, even when the content of the magnetic phase represented by $(Sm_{(1-i)}R_i)_2Fe_{17}N_h$ relative to the entire SmFeN powder is not excessively high, there is practically no problem. Accordingly, the content may be 97 mass % or less, 95 mass % or less, or 93 mass % or less. The remainder of the magnetic phase represented by $(Sm_{(1-i)}R_i)_2Fe_{17}N_h$ corresponds to the content of, part of oxygen and $M^1$ may be interstitially and/or substitutionally present in the magnetic phase.

$M^1$ is one or more selected from Ga, Ti, Cr, Zn, Mn, V, Mo, W, Si, Re, Cu, Al, Ca, B, Ni, and C. The unavoidable impurity element indicates an impurity element that is inevitably included at the time of production, etc. of a raw material and/or a magnetic powder or causes a significant rise in the production cost for avoiding its inclusion. Such an element may be substitutionally and/or interstitially present in the above-described magnetic phase or may be present in a phase other than the magnetic phase. Alternatively, the unavoidable impurity element may be present at the grain boundary between such phases. Incidentally, Ga is gallium, Ti is titanium, Cr is chromium, Zn is zinc, Mn is manganese, V is vanadium, Mo is molybdenum, W is tungsten, Si is silicon, Re is rhenium, Cu is copper, Al is aluminum, Ca is calcium, B is boron, Ni is nickel, and C is carbon.

When $D_{50}$ of the SmFeN powder is 3.00 μm or less, many of SmFeN powder particles have a single magnetic domain. From this viewpoint, $D_{50}$ of the SmFeN powder may be 2.90 μm or less, 2.80 μm or less, 2.70 μm or less, 2.60 μm or less, 2.50 μm or less, 2.40 μm or less, 2.30 μm or less, 2.20 μm or less, or 2.10 μm or less. On the other hand, for the sake of producing magnetic powder particles having a single magnetic domain, $D_{50}$ of the SmFeN powder is 1.50 μm or more, 1.60 μm or more, 1.70 μm or more, 1.80 μm or more, 1.90 μm or more, or 2.00 μm or more.

$D_{50}$ of the SmFeN powder is calculated from the particle size distribution of the SmFeN powder. Also, the particle size distribution of the SmFeN powder is measured (examined) by the following method. In the present description, unless otherwise indicated, the description regarding the size (particle diameter) of the SmFeN powder particles is based on the following measurement method (examination method). Incidentally, $D_{50}$ means the median diameter.

A sample obtained by filling the SmFeN powder with a resin is prepared, and the surface of the sample is polished and observed by an optical microscope. Then, straight lines are drawn on the optical microscope image, the lengths of line segments formed by sectioning the straight lines with the SmFeN particles (bright field) are measured, and the particle size distribution of the SmFeN powder is determined from the frequency distribution of the lengths of the line segments. The particle size distribution determined by this method is substantially equal to the particle size distribution determined by the linear intercept method or dry laser diffraction-scattering method.

In the SmFeN powder, fine particles are sometimes present for production reasons, etc. In the present description, unless otherwise indicated, the "fine particles" means magnetic powder particles having a particle diameter of 1.0 μm or less. As long as $D_{50}$ of the SmFeN powder satisfies the above-described range, the proportion of magnetic powder particles having a particle diameter of 1.0 μm or less (fine particles) in the SmFeN powder is not particularly limited. From the viewpoint of ensuring the mechanical strength of the molded body (rare earth magnet), the proportion of magnetic powder particles having a particle diameter of 1.0 μm or less (fine particles) in the SmFeN powder is preferably as low as possible. The proportion of fine particles to the total number of magnetic powder particles in the SmFeN powder is preferably 15.00% or less, 13.40% or less, 10.00% or less, 8.000 or less, 6.00% or less, 4.00% or less, 3.00% or less, 2.50% or less, 2.00% or less, 1.50% or less, 1.43% or less, or 1.40% or less. For example, in view of convenience in the production of the SmFeN powder, the number of fine particles need not be zero, and there is no problem in practice even when the lower limit of the proportion of fine particles is 0.50%, 1.00%, or 1.20%.

In the production method of the present disclosure, the later-described modifier powder is mixed with the SmFeN powder. Oxygen in the SmFeN powder is absorbed by metallic zinc and/or zinc alloy powder in the modifier powder, so that the magnetic properties, particularly the coercive force, of the product can be enhanced. The content of oxygen in the SmFeN powder may be determined in consideration of the amount of oxygen in the SmFeN powder that the modifier powder absorbs in the process of the production method of the present disclosure. The oxygen content in the SmFeN powder is preferably lower relative to the entire SmFeN powder. The oxygen content in the SmFeN powder is preferably 2.0 mass % or less, more preferably 1.5 mass % or less, still more preferably 1.0 mass % or less, relative to the entire SmFeN powder. On the other hand, an extreme reduction in the content of oxygen in the SmFeN powder incurs an increase in the production cost. For this reason, the content of oxygen in the SmFeN powder may be 0.1 mass % or more, 0.2 mass % or more, or 0.3 mass % or more, relative to the entire SmFeN powder.

As long as those discussed above are satisfied, the production method of the SmFeN powder is not particularly limited, and a commercially available product may be used as well. The production method of the SmFeN powder includes, for example, a method where a Sm—Fe powder is produced from samarium oxide and iron powder by a reduction-diffusion method and the powder is heat-treated at 600° C. or less in an atmosphere of a mixed gas of nitrogen and hydrogen, a nitrogen gas, an ammonia gas, etc. to obtain a Sm—Fe—N powder. Alternatively, the production method includes, for example, a method where a Sm—Fe alloy is produced by a dissolution method and coarsely pulverized particles obtained by coarsely pulverizing the alloy are nitrided and further pulverized to a desired particle diameter. In the pulverization, for example, a dry jet mill, a dry ball mill, a wet ball mill, a wet bead mill, etc. may be used. These may also be used in combination.

Other than the production methods described above, the SmFeN powder can be obtained by a production method including, for example, a pretreatment step of heat-treating an oxide containing Sm and Fe in a reducing gas-containing atmosphere to obtain a partial oxide, a step of heat-treating the partial oxide in the presence of a reducing agent to obtain alloy particles, and a step of subjecting the alloy particles, in an atmosphere containing nitrogen or ammonia, to a heat treatment at a first temperature of 400° C. or more and 470° C. or less and then to a heat treatment at a second temperature of 480° C. or more and 610° C. or less to obtain a nitride. Nitridation sometimes does not fully proceed into the inside of the oxide particle particularly in an alloy particle having a large particle diameter, e.g. an alloy particle containing La, but when nitridation is performed at a two-step temperature, the inside of the oxide particle is fully nitrided as well, so that an anisotropic SmFeN powder having a narrow particle size distribution and high residual magnetization can be obtained.

[Oxide Preparation Step]

The oxide containing Sm and Fe, which is used in the later-described pretreatment step, may be prepared, for example, by mixing Sm oxide and Fe oxide but is preferably produced through a step of mixing a solution containing Sm and Fe with a precipitant to obtain a precipitate containing Sm and Fe (precipitation step) and a step of firing the precipitate to obtain an oxide containing Sm and Fe (oxidation step).

[Precipitation Step]

In the precipitation step, a Sm raw material and a Fe raw material are dissolved in a strong acid solution to prepare a solution containing Sm and Fe. In the case of obtaining $Sm_2Fe_{17}N_3$ as the magnetic phase, the molar ratio of Sm and Fe (Sm:Fe) is preferably from 1.5:17 to 3.0:17, more preferably from 2.0:17 to 2.5:17. Raw materials such as La, W, Co, Ti, Sc, Y, Pr, Nd, Pm, Gd, Tb, Dy, Ho, Er, Tm and/or Lu may be added to the above-described solution. In view of residual magnetic flux density, it is preferable to contain La. In view of coercive force and squareness ratio, it is preferable to contain W. In view of temperature properties, it is preferable to contain Co and/or Ti.

The Sm raw material and Fe raw material are not limited as long as they can dissolve in a strong acid solution. For example, in view of availability, the Sm raw material includes samarium oxide, and the Fe raw material includes $FeSO_4$. The concentration of the solution containing Sm and Fe may be appropriately adjusted in the range where the Sm raw material and Fe raw material are substantially dissolved in the acid solution. In view of solubility, the acid solution includes sulfuric acid, etc.

The solution containing Sm and Fe is reacted with a precipitant, and an insoluble precipitate containing Sm and Fe is thereby obtained. Here, the solution containing Sm and Fe may be sufficient if it is in a state of a solution containing Sm and Fe at the time of reaction with a precipitant, and, for example, after a raw material containing Sm and a raw material containing Fe are prepared as separate solutions, respective solutions may be dropped to react with a precipitant. Even in the case of preparing the raw materials as separate solutions, the solution is appropriately adjusted in the range where each raw material is substantially dissolved in the acid solution. The precipitant is not limited as long as it is an alkaline solution and reacts with the solution containing Sm and Fe to afford a precipitate, and the precipitant includes ammonia water, caustic soda, etc., with caustic soda being preferred.

From the viewpoint that the properties of particles of the precipitate can be easily adjusted, the precipitation reaction is preferably performed by a method where each of the solution containing Sm and Fe and the precipitant is dropped into a solvent such as water. A precipitate having a homogeneous distribution of constituent elements and a narrow particle size distribution as well as a refined powder shape is obtained by appropriately controlling the supply rates of the solution containing Sm and Fe and the precipitant, the reaction temperature, the reaction solution concentration, pH during reaction, etc. By using such a precipitate, the magnetic properties of the SmFeN powder as a final product are enhanced. The reaction temperature may be 0° C. or more and 50° C. or less and is preferably 35° C. or more and 45° C. or less. The reaction solution concentration is, in terms of the total concentration of metal ions, preferably 0.65 mol/L or more and 0.85 mol/L or less, more preferably 0.7 mol/L or more and 0.85 mol/L or less. The reaction pH is preferably 5 or more and 9 or less, more preferably 6.5 or more and 8 or less.

In view of magnetic properties, the solution containing Sm and Fe preferably further contains one or more metals selected from the group consisting of La, W, Co, and Ti. For example, in view of residual magnetic flux density, it is preferable to contain La; in view of coercive force and squareness ratio, it is preferable to contain W; and in view of temperature properties, it is preferable to contain Co and/or Ti. The La raw material is not limited as long as it can dissolve in a strong acid solution, and, for example, in view of availability, $La_2O_3$, $LaCl_3$, etc. are mentioned. The solution is appropriately adjusted in the range where the La raw material, W raw material, Co raw material and Ti raw material are substantially dissolved in an acid solution together with the Sm raw material and Fe raw material, and the acid solution includes, in view of solubility, sulfuric acid. The W raw material includes ammonium tungstate; the Co raw material includes cobalt sulfate; and the titanium raw material includes sulfated titania.

In the case where the solution containing Sm and Fe further contains one or more metals selected from the group consisting of La, W, Co, and Ti, an insoluble precipitate containing Sm, Fe, and one or more selected from the group consisting of La, W, Co, and Ti is obtained. Here, the solution may be sufficient if it contains one or more selected from the group consisting of La, W, Co, and Ti at the time of reaction with the precipitant, and, for example, after respective raw materials are prepared as separate solutions, each solution may be dropped to react with the precipitant, or they may be prepared together with the solution containing Sm and Fe.

The powder particle diameter, powder shape and particle size distribution of the finally obtained SmFeN powder are roughly determined based on the powder obtained in the precipitation step. The size and distribution are preferably such that when the particle diameter of the obtained powder is measured using a wet laser diffraction particle size distribution analyzer, substantially all the powder is in the range of 0.05 μm or more and 20 μm or less, preferably 0.1 μm or more and 10 μm or less.

After separating the precipitate, the separated precipitate is preferably desolventized so as to prevent an incident in which when the precipitate is re-dissolved in the remaining solvent during the heat treatment in the subsequent oxidation step and the solvent evaporates, the precipitate is aggregated or the particle size distribution, powder particle diameter, etc. is changed. The desolventization method specifically includes, for example, in the case of using water as the solvent, a method of drying the separated precipitate in an oven at 70° C. or more and 200° C. or less for a period of 5 hours or more and 12 hours or less.

After the precipitation step, a step of separating and washing the obtained precipitate may be provided. The washing step is appropriately performed until the conductivity of the supernatant solution becomes 5 mS/m$^2$ or less. As for the step of separating the precipitate, for example, a filtration method, a decantation method, etc. may be used after a solvent (preferably water) is added to and mixed with the obtained precipitate.

[Oxidation Step]

The oxidation step is a step of firing the precipitate formed in the precipitation step to thereby obtain an oxide containing Sm and Fe. For example, the precipitate can be converted to an oxide by a heat treatment. In the case of heat-treating the precipitate, the heat treatment needs to be performed in the presence of oxygen and may be performed, for example, in an air atmosphere. Since the heat treatment needs to be performed in the presence of oxygen, it is preferable to contain an oxygen atom in the non-metal portion of the precipitate.

The heat treatment temperature (hereinafter, sometimes referred to as "oxidation temperature") in the oxidation step is not particularly limited but is preferably 700° C. or more and 1,300° C. or less, more preferably 900° C. or more and 1,200° C. or less. It is likely that at less than 700° C., oxidation is insufficient and at more than 1,300° C., the target shape, average particle diameter and particle size distribution of the SmFeN powder are not obtained. The heat treatment time is also not particularly limited but is preferably 1 hour or more and 3 hours or less.

The obtained oxide is an oxide particle where microscopic mixing of Sm and Fe in the oxide particle is sufficiently achieved and the shape, particle size distribution, etc. of the precipitate are reflected.

[Pretreatment Step]

The pretreatment step is a step of heat-treating the above-described oxide containing Sm and Fe in a reducing gas-containing atmosphere to obtain a partial oxide where part of the oxide is reduced.

Note that the partial oxide refers to an oxide where part of the oxide is reduced. The oxygen concentration of the partial oxide is not particularly limited but is preferably 10 mass % or less, more preferably 8 mass % or less. If the concentration exceeds 10 mass %, it is likely that heat generated from reduction with Ca increases in the reduction step and in turn, the firing temperature rises, leading to the formation of particles having undergone abnormal particle growth. Here, the oxygen concentration of the partial oxide can be measured by a non-dispersive infrared absorption method (ND-IR).

The reducing gas is appropriately selected from hydrogen ($H_2$), carbon monoxide (CO), hydrocarbon gases such as methane ($CH_4$), etc., but a hydrogen gas is preferred in view of cost. The flow rate of the gas is appropriately adjusted in the range not causing scattering of the oxide. The heat treatment temperature in the pretreatment step (hereinafter, sometimes referred to as "pretreatment temperature") is preferably 300° C. or more and 950° C. or less. The lower limit is more preferably 400° C. or more, still more preferably 750° C. or more, and the upper limit is more preferably less than 900° C. When the pretreatment temperature is 300° C. or more, reduction of the oxide containing Sm and Fe proceeds efficiently. Also, when the pretreatment temperature is 950° C. or less, particle growth and segregation of oxide particles are suppressed, so that the desired particle diameter can be maintained. The heat treatment time is not particularly limited but may be 1 hour or more and 50 hours or less. In addition, in the case of using hydrogen as the reducing gas, it is preferable to adjust the thickness of the oxide layer used to 20 mm or less and furthermore, adjust the dew point in the reactor to −10° C. or less.

[Reduction Step]

The reduction step is a step of subjecting the partial oxide to a heat treatment in the presence of a reducing agent to obtain alloy particles, and, for example, the reduction is performed by bringing the partial oxide into contact with calcium melt or calcium vapor. In view of magnetic properties, the heat treatment temperature is preferably 920° C. or more and 1,200° C. or less, more preferably 950° C. or more and 1,150° C. or less, still more preferably 980° C. or more and 1,100° C. or less.

Metallic calcium as the reducing agent is used in a granular or powdery form, and the particle diameter thereof is preferably 10 mm or less. Within this range, aggregation during the reduction reaction can be effectively suppressed. Also, the metallic calcium is preferably added in a ratio of 1.1 to 3.0 times, more preferably from 1.5 to 2.5 times, the reaction equivalent (a stoichiometric amount required to reduce the rare earth oxide and in the case where the Fe component is in the form of an oxide, including the amount required for its reduction).

In the reduction step, a disintegration promoter may be used, if desired, together with the metallic calcium as the reducing agent. The disintegration promoter is appropriately used so as to promote disintegration and granulation of the product in the later-described post-treatment step and includes, for example, an alkaline earth metal salt such as calcium chloride, and an alkaline earth oxide such as calcium oxide, etc. The disintegration promoter is used in a ratio of 1 mass % or more and 30 mass % or less, preferably 5 mass % or more and 30 mass % or less, per samarium oxide.

[Nitridation Step]

The nitridation step is a step of performing a nitridation treatment by subjecting, in an atmosphere containing nitrogen or ammonia, the alloy particles obtained in the reduction step to a heat treatment at a first temperature of 400° C. or more and 470° C. or less and then to a heat treatment at a second temperature of 480° C. or more and 610° C. or less to obtain anisotropic magnetic powder particles. Since the particulate precipitate obtained in the precipitation step above is used, porous aggregated alloy particles are obtained in the reduction step. This enables an immediate heat treatment and nitridation in a nitrogen atmosphere without performing a pulverization treatment, so that uniform nitridation can be achieved. If the alloy particles are heat-treated at a high temperature of the second temperature without being nitrided at the first temperature, abnormal heat generation may occur due to rapid progress of nitridation and in turn, SmFeN may be decomposed to significantly reduce the magnetic properties. In addition, the atmosphere in the nitridation step is preferably substantially a nitrogen-containing atmosphere, because the progress of nitridation can be more slowed down. The term "substantially" as referred to herein is used considering that elements other than nitrogen are inevitably included due to mixing, etc. of impurities, and, for example, the proportion of nitrogen in the atmosphere is 95% or more, preferably 97% or more, more preferably 99% or more.

The first temperature in the nitridation step is 400° C. or more and 470° C. or less but is preferably 410° C. or more and 450° C. or less. If the temperature is less than 400° C., the progress of nitridation is very slow, and if it exceeds 470° C., overnitridation or decomposition is likely to occur due to heat generation. The heat treatment time at the first temperature is not particularly limited but is preferably 1 hour or more and 40 hours or less, more preferably 20 hours or less. If the heat treatment time is less than 1 hour, the nitridation may not proceed sufficiently, and if it exceeds 40 hours, the productivity is reduced.

The second temperature is 480° C. or more and 610° C. or less but is preferably 500° C. or more and 550° C. or less. If the temperature is less than 480° C., when the particles are large, the nitridation may not proceed sufficiently, and if it exceeds 610° C., overnitridation or decomposition is likely to occur. The heat treatment time at the second temperature is preferably 15 minutes or more and 5 hours or less, more preferably 30 minutes or more and 2 hours or less. If the heat treatment time is less than 15 minutes, the nitridation may not proceed sufficiently, and if it exceeds 5 hours, the productivity is reduced.

The heat treatment at the first temperature and the heat treatment at the second temperature may be performed successively, and a heat treatment at a temperature lower than the second temperature may be provided therebetween, but in view of productivity, those heat treatments are preferably performed successively.

[Post-Treatment Step]

The product obtained after the nitridation step contains by-produced CaO, unreacted metallic calcium, etc., in addition to the magnetic powder particles, and these are sometimes combined to form a sintered aggregate state. The CaO and metallic calcium can be separated as a calcium hydroxide ($Ca(OH)_2$) suspension by introducing the product obtained after the nitridation step into cooling water. Furthermore, the remaining calcium hydroxide may be fully removed by washing the magnetic powder with acetic acid, etc. Upon introducing the product into water, disintegration, i.e., micronization, of the reaction product in a combined and sintered aggregate state proceeds due to oxidation of metallic calcium with water and hydration of by-produced CaO.

[Alkali Treatment Step]

The product obtained after the nitridation step may be introduced into an alkaline solution. The alkaline solution used in the alkali treatment step includes, for example, an aqueous calcium hydroxide solution, an aqueous sodium hydroxide solution, an aqueous ammonia solution, etc. Among these, in view of wastewater treatment and high pH, an aqueous calcium hydroxide solution and an aqueous sodium hydroxide solution are preferred. A Sm-rich layer containing some oxygen remains as a result of the alkali treatment of the product and functions as a protective layer and consequently, an increase in the oxygen concentration due to the alkali treatment is suppressed.

The pH of the alkaline solution used in the alkali treatment step is not particularly limited but is preferably 9 or more, more preferably 10 or more. If the pH is less than 9, the reaction rate at the time of forming calcium hydroxide is high, and large heat generation occurs, as a result, the oxygen concentration of the finally obtained SmFeN powder tends to be high.

As for the SmFeN powder obtained after treatment with an alkaline solution in the alkali treatment step, its water content can also be reduced, if desired, by decantation or other like methods.

[Acid Treatment Step]

After the alkali treatment step, an acid treatment step of further treating the powder with an acid may be provided. In the acid treatment step, at least part of the Sm-rich layer above is removed to reduce the oxygen concentration in the entire SmFeN powder. Also, in the manufacturing method presented in an embodiment of the present invention, pulverization, etc. is not performed, and the SmFeN powder therefore has a small average particle diameter and a narrow particle size distribution and in addition, does not include fine powder produced by pulverization, etc., so that an increase in the oxygen concentration can be suppressed.

The acid used in the acid treatment step is not particularly limited and includes, for example, hydrogen chloride, nitric acid, sulfuric acid, acetic acid, etc. Among these, in view of no remaining of impurities, hydrogen chloride and nitric acid are preferred.

The amount of the acid used in the acid treatment step is preferably 3.5 parts by mass or more and 13.5 parts by mass or less, more preferably 4 parts by mass or more and 10 parts by mass or less, per 100 parts by mass of the SmFeN powder. If the amount used is less than 3.5 parts by mass, oxide on the surface of the SmFeN powder remains to increase the oxygen concentration, whereas if the amount used exceeds 13.5 parts by mass, reoxidation is likely to occur upon exposure to the atmosphere and since the acid dissolves the SmFeN powder, the cost also tends to rise. When the amount of the acid is 3.5 parts by mass or more and 13.5 parts by mass or less per 100 parts by mass of the SmFeN powder, a Sm-rich layer oxidized to such a degree that reoxidation is less likely to occur upon exposure to the atmosphere after the acid treatment can cover the SmFeN powder surface and therefore, a SmFeN powder having a low oxygen concentration, a small average particle diameter, and a narrow particle size distribution is obtained.

As for the SmFeN powder obtained after treatment with an acid in the acid treatment step, its water content can also be reduced, if desired, by decantation or other like methods.

[Dehydration Step]

It is preferable to include, after the acid treatment step, a step of performing a dehydration treatment. By the dehydration treatment, the amount of moisture in the solid content before vacuum drying can be reduced, and the progress of oxidation during drying, which occurs due to a larger amount of moisture contained in the solid content before vacuum drying, can be suppressed. Here, the dehydration treatment means a treatment of reducing the moisture value contained in the solid content after the treatment relative to the solid content before the treatment by applying a pressure or centrifugal force and does not encompass simple decantation, filtration or drying. The method for the dehydration treatment is not particularly limited but includes compression, centrifugal separation, etc.

The amount of water contained in the SmFeN powder after the dehydration treatment is not particularly limited but, from the viewpoint of suppressing the progress of oxidation, is preferably 13 mass % or less, more preferably 10 mass % or less.

The SmFeN powder obtained by performing the acid treatment or the SmFeN powder obtained by performing the dehydration treatment after the acid treatment is preferably vacuum-dried. The drying temperature is not particularly limited but is preferably 70° C. or more, more preferably 75° C. or more. The drying time is also not particularly limited but is preferably 1 hour or more, more preferably 3 hours or more.

The SmFeN powder prepared by the above-described method, etc. is classified to adjust $D_{50}$ of the SmFeN powder. As for the classification method, a well-known method can be used. The classification method includes, for example, use of a sieve, gravity classification, inertial classification, and centrifugal classification, etc.

<Modifier Powder Preparation Step>

A modifier powder is prepared. The modifier powder used in the production method of the present disclosure contains at least either metallic zinc or zinc alloy. The metallic zinc means zinc that is not alloyed. Particles of the SmFeN powder are modified and bonded by the zinc component in the modifier powder. Also, in the case where the SmFeN powder particles include fine particles, the adverse effect of fine particles on magnetic properties is eliminated.

Mainly in the later-described heat treatment step, the zinc component of the modifier powder diffuses to the surface of the SmFeN powder particle to form a Fe—Zn alloy phase. The “mainly” means that although the diffusion occurs also in the sintering step preceding the heat treatment step, the diffusion occurs mostly in the heat treatment step. On the surface of the SmFeN powder particle, the crystal structure such as $Th_2Zn_{17}$ type and/or $Th_2Ni_{17}$ type is not complete in some portions, and in such portions, an a-Fe phase is present and gives rise to demagnetization. In the heat treatment step, the a-Fe phase forms a Fe—Zn alloy phase together with the zinc component of the modifier powder to suppress the demagnetization. More specifically, Fe and Zn interdiffuse between the SmFeN powder particles and the modifier powder particles and form a Fe—Zn alloy phase. In addition, the SmFeN powder particles can be strongly bonded to each other by the modifier powder. That is, the modifier powder functions also as a binder.

In the SmFeN powder, fine particles are sometimes present, but even in such a case, when the sintered body is heat-treated, fine Fe—Zn alloy phases derived from fine particles are made largely unrecognizable. The reason therefor is considered as follows. Fine particles in the SmFeN powder allow a Fe—Zn alloy phase to be formed not only on the particle surface but also almost throughout the particle, because in the fine particle, the proportion of a portion where the crystal structure such as $Th_2Zn_{17}$ type and/or $Th_2Ni_{17}$ type is not complete is large. Many of Fe—Zn alloy phases derived from fine particles are then integrated with Fe—Zn alloy phases formed on the surface of SmFeN particles having a relatively large particle diameter (particles except for fine particles).

When the content ratio of the zinc component in the modifier powder is 6 mass % or more, 7 mass % or more, or 8 mass % or more, relative to the mixed powder, as illustrated in FIG. 3A, the surface of the SmFeN powder particle is mostly covered by the modified phase, and demagnetization can be suppressed. That is, on the surface of the SmFeN powder particle, a Fe—Zn alloy phase as a modified phase is formed in a coating-like manner.

On the other hand, when the content ratio of the zinc component in the modifier powder is 30 mass % or less relative to the mixed powder, a reduction in magnetization due to use of the modifier powder can be suppressed. From this viewpoint, the content ratio of the zinc component in the modifier powder may be 25 mass % or less, 20 mass % or less, 15 mass % or less, or 10 mass % or less, relative to the mixed powder.

In the production method of the present disclosure, a SmFeN powder having $D_{50}$ in the range above is used, so that even with a relatively small amount of modifier powder, after the sintered body is heat-treated, the surface of the SmFeN powder particle can mostly be covered by a modified phase as illustrated in FIG. 3A. From this viewpoint, the content ratio of the zinc component in the modifier powder may be 10 mass % or less, less than 10 mass %, or 9 mass % or less, relative to the mixed powder.

When the zinc alloy is represented by Zn-$M^2$, an element that is alloyed with Zn (zinc) to drop the melting start temperature of the zinc alloy below the melting point of Zn, and an unavoidable impurity element may be selected as $M^2$. In this case, the sinterability in the later-described pressure sintering step is enhanced. $M^2$ that drops the melting start temperature below the melting point of Zn includes an element, etc. that forms a eutectic alloy between Zn and $M^2$. Such $M^2$ includes, typically, for example, Sn, Mg, Al, and a combination of these. Sn is tin, Mg is magnesium, and Al is aluminum. An element that does not inhibit the melting point dropping action of these elements as well as the properties of the product can also be selected as $M^2$. Incidentally, the unavoidable impurity element indicates an impurity element that is inevitably included or causes a significant rise in the production cost for avoiding its inclusion, such as impurities contained in raw materials of the modifier powder.

In the zinc alloy represented by Zn-$M^2$, the ratios (molar ratios) of Zn and $M^2$ may be appropriately determined to give an appropriate sintering temperature. The ratio (molar ratio) of $M^2$ to the entire zinc alloy may be, for example, 0.05 or more, 0.10 or more, or 0.20 or more, and may be 0.90 or less, 0.80 or less, 0.70 or less, 0.60 or less, 0.50 or less, 0.40 or less, or 0.30 or less.

The modifier powder may optionally contain, other than the metallic zinc and/or zinc alloy, a substance having a binder function and/or a modification function as well as other functions, within a range not impairing the effects of the present invention. Other functions include, for example, a function of enhancing corrosion resistance.

The particle diameter of the modifier powder is not particularly limited but is preferably smaller than the particle diameter of the SmFeN powder. This facilitates spreading of particles of the modifier powder among particles of the SmFeN powder. The particle diameter of the modifier powder may be, for example, in terms of $D_{50}$ (median diameter), 0.1 μm or more, 0.5 μm or more, or 1.0 μm or more, and may be 12.0 μm or less, 11.0 μm or less, 10.0 μm or less, 9.0 μm or less, 8.0 μm or less, 7.0 μm or less, 6.0 μm or less, 5.0 μm or less, 4.0 μm or less, or 2.0 μm or less. Incidentally, the particle diameter $D_{50}$ (median diameter) of the modifier powder is measured, for example, by a dry laser diffraction-scattering method.

When the oxygen content of the modifier powder is small, much oxygen in the SmFeN powder can be advantageously absorbed. From this viewpoint, the oxygen content of the modifier powder is preferably 5.0 mass % or less, more preferably 3.0 mass % or less, and still more preferably 1.0 mass % or less, relative to the entire modifier powder. On the other hand, for extremely reducing the oxygen content of the modifier powder, an increase in the manufacturing cost is caused. For this reason, the oxygen content of the modifier powder may be 0.1 mass % or more, 0.2 mass % or more, or 0.3 mass % or more, relative to the entire modifier powder.

<Mixing Step>

The SmFeN powder and the modifier powder are mixed to obtain a mixed powder. The mixing method is not particularly limited. The mixing method includes a methods of mixing the powders by means of a mortar, a muller wheel mixer, an agitator mixer, a mechanofusion, a V-type mixer, a ball mill, etc. These methods may be combined. The V-type mixer is an apparatus having a container formed by connecting two cylindrical containers in V shape, in which when the containers are rotated, the powders in the containers are caused to repeatedly experience aggregation and separation due to gravity and centrifugal force and thereby mixed.

<Magnetic-Field Molding Step>

The mixed powder is compression-molded in a magnetic field to obtain a magnetic-field molded body. Orientation can thereby be imparted to the magnetic-field molded body and in turn, anisotropy can be imparted to the product (rare earth magnet) to enhance residual magnetization.

The magnetic-field molding method may be a well-known method such as a method of compression-molding the mixed powder by use of a molding die having arranged therearound a magnetic field generation device. The molding pressure may be, for example, 10 MPa or more, 20 MPa or more, 30 MPa or more, 50 MPa or more, 100 MPa or more, or 150 MPa or more, and may be 1,500 MPa or less, 1,000 MPa or less, or 500 MPa or less. The time for which the molding pressure is applied may be, for example, 0.5 minutes or more, 1 minute or more, or 3 minutes or more, and may be 10 minutes or less, 7 minutes or less, or 5 minutes or less. The magnitude of the magnetic field applied may be, for example, 500 kA/m or more, 1,000 kA/m or more, 1,500 kA/m or more, or 1,600 kA/m or more, and may be 20,000 kA/m or less, 15,000 kA/m or less, 10,000 kA/m or less, 5,000 kA/m or less, 3,000 kA/m or less, or 2,000 kA/m or less. The method for applying a magnetic field includes, e.g., a method of applying a static magnetic field using an electromagnet, and a method of applying a pulsed magnetic field using an alternating current. Also, in order to prevent oxidation of the mixed powder, the magnetic-field molding is preferably performed in an inert gas atmosphere. The inert gas atmosphere encompasses a nitrogen gas atmosphere.

<Pressure Sintering Step>

The magnetic-field molded body is pressure-sintered to obtain a sintered body. The method for pressure sintering is not particularly limited, and a well-known method can be applied. The pressure sintering method includes, for example, a method where a die having a cavity and a punch capable of sliding inside the cavity are prepared, the magnetic-field molded body is inserted into the cavity and while applying a pressure to the magnetic-field molded body by means of the punch, the magnetic-field molded body is sintered. In this method, typically, the die is heated using a high-frequency induction coil. Alternatively, a Spark Plasma Sintering (SPS) method may also be used.

The pressure sintering conditions may be appropriately selected so that the magnetic-field molded body can be sintered while applying a pressure to the magnetic-field molded body (hereinafter, sometimes referred to as "pressure-sintered").

When the sintering temperature is 300° C. or more, Fe on the particle surface of the SmFeN powder and the zinc component in the modifier powder slightly interdiffuse in the magnetic-field molded body, contributing to sintering. The interdiffusion may be solid-phase diffusion or may be liquid-phase diffusion. From this viewpoint, the sintering temperature may be, for example, 310° C. or more, 320° C. or more, 340° C. or more, or 350° C. or more. On the other hand, when the sintering temperature is 430° C. or less, Fe on the particle surface of the SmFeN powder and the zinc component in the modifier powder are kept from excessively interdiffusing, as a result, it is unlikely that a trouble occurs in the later-described heat treatment step or an adverse effect is exerted on the magnetic properties of the obtained sintered body. From this viewpoint, the sintering temperature may be 420° C. or less, 410° C. or less, 400° C. or less, 390° C. or less, 380° C. or less, 370° C. or less, or 360° C. or less.

As for the sintering pressure, a sintering pressure capable of increasing the density of the sintered body may be appropriately selected. Typically, the sintering pressure may be 100 MPa or more, 200 MPa or more, 400 MPa or more, 500 MPa or more, 600 MPa or more, 800 MPa or more, or 1,000 MPa or more, and may be 2,000 MPa or less, 1,800 MPa or less, 1,600 MPa or less, 1,500 MPa or less, 1,300 MPa or less, or 1,200 MPa or less.

The sintering time may be appropriately determined such that Fe on the particle surface of the SmFeN powder slightly interdiffuses with the zinc component in the modifier powder. The sintering time does not include the temperature rise time until reaching the heat treatment temperature. The sintering time may be, for example, 1 minute or more, 2 minutes or more, or 3 minutes or more, and may be 30 minutes or less, 20 minutes or less, 10 minutes or less, or 5 minutes or less.

Upon elapse of the sintering time, the sintering is ended by cooling the sintered body. At a higher cooling rate, oxidation, etc. of the sintered body can be suppressed. The cooling rate may be, for example, from 0.5 to 200° C./sec.

The sintering atmosphere is preferably an inert gas atmosphere so as to suppress oxidation of the magnetic-field molded body and sintered body. The inert gas atmosphere encompasses an argon gas atmosphere and a nitrogen gas atmosphere. Alternatively, the sintering may also be performed in a vacuum.

<Heat Treatment Step>

The sintered body is heat-treated. As a result, a Fe—Zn alloy phase is formed in a coating-like manner on the surface of the SmFeN powder particle, and not only the particles of the SmFeN powder are more strongly bonded to the particles of the modifier powder (hereinafter, this is sometimes referred to as "solidifying" or "solidification") but also the modification is promoted. Demagnetization can be suppressed by the modification. Also, in the case where the SmFeN powder includes fine particles, a Fe—Zn alloy phase is formed almost throughout the fine particle, and many of the Fe—Zn alloy phases are integrated with coating-like Fe—Zn alloy phases formed on the surface of particles having a relatively large particle diameter (particles other than fine particles).

When the heat treatment temperature is 350° C. or more, a modified phase 20 as illustrated in FIG. 3A can be obtained. From this viewpoint, the heat treatment temperature x° C. may be 360° C. or more, 370° C. or more, or 380° C. or more.

On the other hand, when the heat treatment temperature is 410° C. or less, Fe and Zn are kept from excessively interdiffusing. However, when the heat treatment temperature is 410° C., although solidification and modification as well as elimination of adverse effect of fine particles can be achieved, a knick is formed. Therefore, the heat treatment temperature is preferably 400° C. or less, or 390° C. or less. Here, the knick refers to a phenomenon where in a region outside the region showing a coercive force of a magnetization-magnetic field curve (M-H curve), the magnetization rapidly decreases with a slight reduction in the magnetic field.

The heat treatment time is not particularly limited, but denoting as x° C. the heat treatment temperature and as y hours the heat treatment time, the heat treatment time may determined using the following formulae (1) and (2):

$$y \geq -0.32x + 136 \quad \text{formula (1)}$$

$$350 \leq x \leq 410 \quad \text{formula (2)}$$

The formulae (1) and (2) are experimentally confirmed and specifically demonstrate that regarding the solidification and the formation of a modified phase 20 illustrated in FIG. 3A, as the heat treatment temperature is higher, the heat treatment time is shorter.

With respect to the formation of a modified phase 20 illustrated in FIG. 3A, the heat treatment is ideally performed until the particle surface of the SmFeN powder is entirely covered by the modified phase 20, that is, until the modified phase 20 covers 100% of the particle surface of the SmFeN powder (coverage rate: 100%). However, when the heat treatment is performed until the modified phase 20 covers 90% or more, 92% or more, 94% or more, 96% or more, or 98% or more, of the particle surface of the SmFeN powder, this is substantially equivalent to entirely covering the particle surface of the SmFeN powder by the modified phase 20. The measurement method of the coverage rate is described in the paragraph "<<Rare Earth Magnet>>".

From the viewpoint of enhancing the coverage rate of the modified phase 20 as much as possible, formula (1) is more preferably $y \geq -0.32x+137$, still more preferably $y \geq -0.32x+140$, yet still more preferably $y \geq -0.32x+145$.

As described above, the modified phase 20 illustrated in FIG. 3A is formed by alloying between an a-Fe phase present on the surface of the SmFeN powder particle and the zinc component in the modifier powder. For forming the modified phase 20, the heat treatment time may be, typically, 3 hours or more, 4 hours or more, 5 hours or more, 8 hours or more, 10 hours or more, 12 hours or more, 15 hours or more, 17 hours or more, or 20 hours or more. On the other hand, the amount of the α-Fe phase present on the surface of the SmFeN powder particle is limited, and the depth to which the zinc component in the modifier powder diffuses into the SmFeN powder particle is also limited. Therefore, even when the heat treatment is performed over an excessively long period of time, the formation of the modified phase 20 is saturated. From this viewpoint, the heat treatment time y (hours) is preferably 40 hours or less, 35 hours or less, 30 hours or less, 25 hours or less, or 24 hours or less.

In order to suppress oxidation of the sintered body, the sintered body is preferably heat-treated in a vacuum or in an inert gas atmosphere, and the inert gas atmosphere encompasses a nitrogen gas atmosphere. The heat treatment of the sintered body may be performed in a die used for the pressure sintering, but in this case, a pressure is not imposed on the sintered body during heat treatment. When the above-described heat treatment conditions are satisfied, it is unlikely that a normal magnetic phase is decomposed to form an a-Fe phase and as a result of this formation, Fe and Zn are excessively interdiffused.

The rare earth magnet obtained by the hereinabove-described production method of the present disclosure is described below.

<<Rare Earth Magnet>>

In the rare earth magnet of the present disclosure, as described above, the SmFeN powder is sintered together with a modifier powder containing at least either a metallic zinc or a zinc alloy.

The SmFeN powder has a magnetic phase containing Sm, Fe and N and at least partially having a crystal structure of either $Th_2Zn_{17}$ type or $Th_2Ni_{17}$ type. The composition, etc. of the magnetic phase are as described in "<<Manufacturing Method of Rare Earth Magnet>>".

In the rare earth magnet of the present disclosure, since the SmFeN powder is sintered together with a modifier powder containing at least either a metallic zinc or a zinc alloy, the content ratio of the zinc component of the rare earth magnet of the present disclosure is substantially equal to the content ratio of the zinc component in the modifier powder relative to the mixed powder. Also, since the modified phase formed on the surface of the SmFeN powder particle is thin, $D_{50}$ of the SmFeN powder in the rare earth magnet of the present disclosure is substantially equal to $D_{50}$ of the SmFeN powder before sintering. Their specific numerical ranges, etc. are as described in "<<Production Method of Rare Earth Magnet>>".

In the rare earth magnet of the present disclosure, a modified phase is formed on the surface of the SmFeN powder particle, and the modified phase is a Fe—Zn alloy phase. The modified phase covers 90% or more, 92% or more, 94% or more, 96% or more, or 98% or more of the surface of the SmFeN powder particle. Such a modified phase enables to suppress demagnetization.

The coverage rate is measured (examined) by the following method. In the present description, unless otherwise indicated, the description regarding the coverage rate is based on the following measurement method (examination method).

A cross-section of the sintered body after heat treatment is polished, and the polished surface is subjected to component analysis (surface analysis) on each of Fe and Zn to obtain a Fe mapping image and a Zn mapping image. The Fe mapping image is superimposed on the Zn mapping image to acquire an integrated mapping image. In the integrated mapping image, the area of a SmFeN powder particle is identified, and the perimeter length L of the SmFeN powder particle is measured. In the integrated mapping image, out of the perimeter of the SmFeN powder particle, the length $L_c$ of a portion sandwiched between the Fe detection area and the Zn detection area and the length $L_g$ of a portion sandwiched between the Fe detection area and the non-detection area are measured. The non-detection area means an area where both Fe and Zn are not detected. The coverage rate (%) is calculated according to the following formula (3):

$$\text{Coverage rate (\%)} = L_c/(L_c+L_g)\times 100 \qquad \text{formula (3)}$$

In formula (3), $(L_c+L_g)$ represents an entire circumferential length of the surface of the SmFeN powder particle in the cross-section, and Le represents a coating length on the SmFeN powder particle surface.

<<Alteration>>

In the rare earth magnet of the present disclosure and the manufacturing method thereof, other than those described hereinbefore, various alterations can be added within the scope of contents as set forth in claims.

For example, in the case where the magnetic powder includes fine particles, as long as $D_{50}$ of the magnetic powder satisfies the above-described range, a part or all of fine particles may be removed in advance before magnetic-field molding. The fine particle-removing operation (fine particle-removing method) is not particularly limited. The fine particle-removing operation (fine particle-removing method) includes, e.g., a method using a cyclone (registered trademark) classifier, a method using a sieve, a method utilizing a magnetic field, and a method utilizing static electricity. The operation may also be a combination of these methods. The removal of fine particles makes it possible to further increase the density of the molded body (rare earth magnet) and further enhance the magnetization.

EXAMPLES

The rare earth magnet of the present disclosure and the manufacturing method thereof are described more specifically below by referring to Examples and Comparative Examples. Note that the rare earth magnet of the present disclosure and the manufacturing method thereof are not limited to the conditions employed in the following Examples.

<<Preparation of Sample>>

Samples of Examples 1 to 4 and Comparative Examples 1 to 3 were prepared in the following manner.

5.0 kg of $FeSO_4 \cdot 7H_2O$ was mixed and dissolved in 2.0 kg of pure water. Furthermore, 0.49 kg of $Sm_2O_3$, 0.74 kg of 70% sulfuric acid, and 0.035 kg of $La_2O_3$ were added, and these were thoroughly stirred and thereby completely dissolved. Next, pure water was added to the resulting solution so as to adjust the Fe concentration and Sm concentration to finally 0.726 mol/L and 0.112 mol/L, respectively. Thus, a SmFeLa sulfuric acid solution was obtained.

[Precipitation Step]

The entire amount of the prepared SmFeLa sulfuric acid solution was added dropwise to 20 kg of pure water kept at a temperature of 40° C. with stirring over 70 minutes from the start of the reaction, and a 15% ammonia solution was added dropwise at the same time to adjust the pH to 7 to 8. Consequently, a slurry containing SmFeLa hydroxide was obtained. The obtained slurry was washed with pure water by decantation, and the hydroxide was then separated by solid-liquid separation. The separated hydroxide was dried for 10 hours in an oven at 100° C.

[Oxidation Step]

The hydroxide obtained in the precipitation step was fired in the atmosphere at 1,000° C. for 1 hour. After cooling, a red SmFeLa oxide was obtained as a raw material powder.

[Pretreatment Step]

100 g of the SmFeLa oxide was put in a steel container to a thickness of 10 mm. The container was placed in a furnace, and after reducing the pressure to 100 Pa, the temperature was raised to a pretreatment temperature of 850° C. while introducing hydrogen gas and held as it was for 15 hours. The oxygen concentration was measured by a non-dispersive infrared absorption method (ND-IR) (EMGA-820, manufactured by Horiba Ltd.) and found to be 5 mass %. This reveals that there was obtained a black partial oxide in which oxygen bonded to Sm is not reduced and 95% of oxygen bonded to Fe is reduced.

[Reduction Step]

60 g of the partial oxide obtained in the pretreatment step was mixed with 19.2 g of a metallic calcium having an average particle diameter of about 6 mm, and the mixture was placed in a furnace. After the inside of the furnace was evacuated to a vacuum, an argon gas (Ar gas) was introduced, and the temperature was raised to 1,090° C. and held for 45 minutes, followed by cooling to obtain SmFe powder particles.

[Nitridation Step]

Subsequently, the temperature inside the furnace was cooled to 100° C., followed by vacuum evacuation, and while introducing nitrogen gas, the temperature was then raised to 430° C. of the first temperature and held for 3 hours. Furthermore, the temperature was raised to 500° C. of the second temperature and held for 1 hour, followed by cooling to obtain a magnetic powder particle-containing aggregated product.

[Post-Treatment Step]

The aggregated product obtained in the nitridation step was introduced into 3 kg of pure water and stirred for 30 minutes. After standing still, the supernatant was drained by decantation. The introduction into pure water, stirring, and decantation were repeated 10 times. Subsequently, 2.5 g of 99.9% acetic acid was introduced and stirred for 15 minutes. After standing still, the supernatant was drained by decantation. The introduction into pure water, stirring, and decantation were repeated twice.

[Acid Treatment Step]

An aqueous 6% hydrochloric acid solution was added such that its amount becomes 4.3 parts by mass in terms of hydrogen chloride per 100 parts by mass of the powder obtained in the post treatment, and stirred for 1 minute. After standing still, the supernatant was drained by decantation. The introduction into pure water, stirring, and decantation were repeated twice. Following solid-liquid separation, vacuum drying was performed at 80° C. for 3 hours to obtain a SmFeN powder having a composition of $Sm_{9.2}Fe_{77.1}N_{13.59}La_{0.11}$.

The SmFeN powder was packed into a sample container together with paraffin wax and after the paraffin was melted using a drier, the easy axes of magnetization were aligned in an orientation magnetic field of 16 kA/m. The sample subjected to magnetic field orientation was pulse magnetized in a magnetizing magnetic field of 32 kA/m and measured for magnetic properties at room temperature by means of VSM (vibrating sample magnetometer) having a maximum magnetic field of 16 kA/m, as a result, the residual magnetization and coercive force were 1.44 T and 750 kA/m, respectively.

Figure 4:
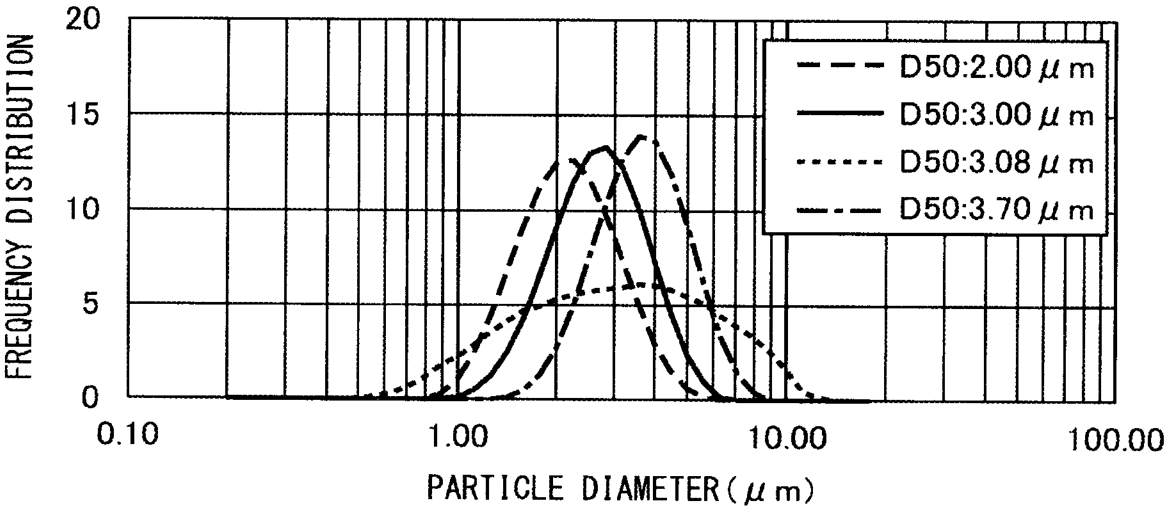
FIG. 4 is a graph illustrating the particle size distribution of a SmFeN powder after classification.

The SmFeN powder obtained as above was classified so as to adjust $D_{50}$ of the SmFeN powder to 2.00 μm, 3.00 μm, 3.08 μm, and 3.70 μm. FIG. 4 is a graph illustrating the particle size distribution of the SmFeN powder after classification. The classification was performed using a semi-free vortex classifier (A-20, manufactured by Nisshin Engineering Inc.). $D_{50}$ of each sample is shown in Table 1-1. Also, with respect to each sample, the proportion of SmFeN powder particles having a particle diameter of 1.00 μm or less (fine particles) is shown together in Table 1-1. The proportion of SmFeN powder particles having a particle diameter of 1.00 μm or less (fine particles) is a proportion to the total number of SmFeN powder particles.

A metallic zinc powder was prepared as the modifier powder. $D_{50}$ of the metallic zinc powder was 0.5 μm. In addition, the purity of the metallic zinc powder was 99.5 mass %.

The SmFeN powder and the modifier powder were mixed to obtain a mixed powder. The content ratio of the zinc component to the entire mixed powder, i.e., the mixing amount of the modifier powder, was as shown in Table 1-1.

The mixed powder was compression-molded in a magnetic field to obtain a magnetic-field molded body. The pressure for the compression molding was 50 MPa. The pressure application time was 1 minute. The applied magnetic field was 1,600 kA/m. In addition, the compression molding was performed in a nitrogen atmosphere.

The magnetic-field molded body was pressure-sintered. The pressure sintering was performed using a high-frequency induction coil in an argon gas atmosphere (97,000 Pa). The sintering temperature was 380° C., the sintering pressure was 500 MPa, and the sintering pressure application time was 5 minutes.

The sintered body was heat-treated in a vacuum (10-2 Pa). The heat treatment temperature was 380° C., and the heat treatment time was 24 hours.

<<Evaluation>>

Each sample was measured for the coverage rate and magnetic properties. The magnetic properties were measured using a vibrating sample magnetometer (VSM) at room temperature and at 120° C. The demagnetization was evaluated by a magnetic field $H_k$ when at 120° C., the magnetization was decreased by 10% from the residual magnetization $B_r$.

Figure 5:
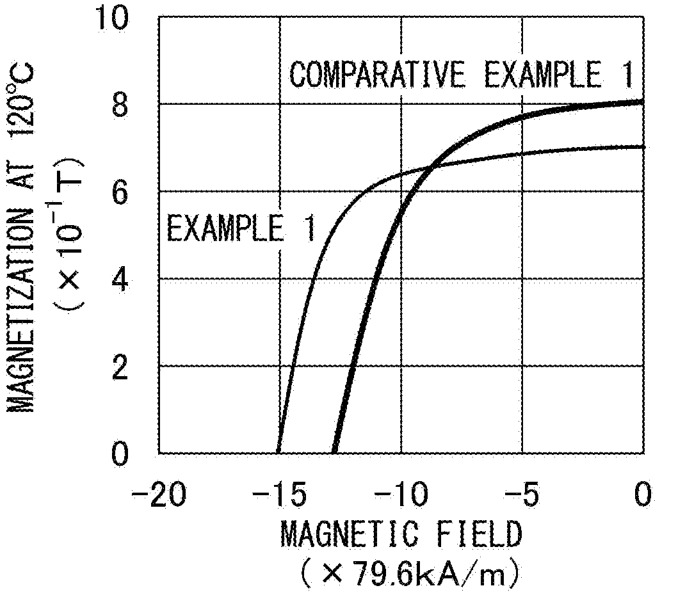
FIG. 5 is a graph illustrating demagnetization curves of the samples of Example 1 and Comparative Example 1.
Figure 6:
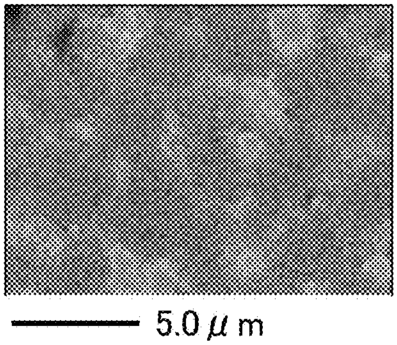
FIG. 6 is an integrated mapping image of the sample of Example 1.
Figure 7:
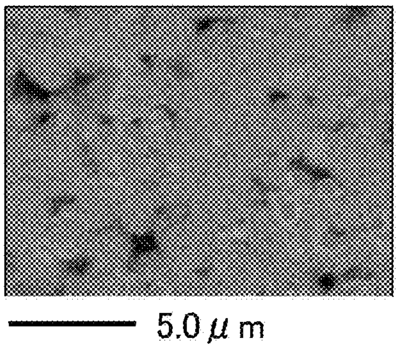
FIG. 7 is an integrated mapping image of the sample of Comparative Example 1.

The evaluation results are shown in Tables 1-1 and 1-2 and FIGS. 5 to 7. In Table 1-2, the residual magnetization and coercive force were measurement results at room temperature. FIG. 5 is a graph illustrating demagnetization curves of the samples of Example 1 and Comparative Example 1. FIG. 6 is an integrated mapping image of the sample of Example 1. FIG. 7 is an integrated mapping image of the sample of Comparative Example 1. In FIGS. 6 and 7, the darkest part represents a gap.

TABLE 1

Table 1-1

| | SmFeN Powder | | Modifier Powder | Magnetic-Field Molding | | | Pressure Sintering | | | |
|---|---|---|---|---|---|---|---|---|---|---|
| | D50 (μm) | Proportion of Fine Particles (%) | Content Ratio of Zinc Component (mass %) | Atmosphere | Pressure (MPa) | Time (min) | Atmosphere | Temperature (° C.) | Pressure (MPa) | Time (min) |
| Example 1 | 3.00 | 0.00 | 10 | nitrogen | 50 | 1 | argon | 380 | 500 | 5 |
| Example 2 | 3.00 | 0.00 | 15 | | | | | | | |
| Example 3 | 3.00 | 0.00 | 6 | | | | | | | |
| Example 4 | 2.00 | 1.43 | 10 | | | | | | | |
| Comparative Example 1 | 3.00 | 0.00 | 5 | nitrogen | 50 | 1 | argon | 380 | 500 | 5 |
| Comparative Example 2 | 3.08 | 13.40 | 10 | | | | | | | |
| Comparative Example 3 | 3.70 | 0.00 | 10 | | | | | | | |

TABLE 2

Table 1-2

| | Heat Treatment | | | Coverage | Magnetic Properties | | |
|---|---|---|---|---|---|---|---|
| | Atmosphere | Temperature (° C.) | Time (hours) | Rate (%) | Room-Temperature Residual Magnetization (T) | Room-Temperature Coercive Force (kA/m) | 120° C. Hk (kA/m) |
| Example 1 | vacuum $10^{-2}$ Pa | 380 | 24 | 95 | 0.78 | 2626 | 990 |
| Example 2 | | | | 100 | 0.68 | 2654 | 998 |
| Example 3 | | | | 90 | 0.84 | 2428 | 710 |
| Example 4 | | | | 93 | 0.67 | 2674 | 1001 |
| Comparative Example 1 | vacuum $10^{-2}$ Pa | 380 | 24 | 84 | 0.86 | 2351 | 649 |
| Comparative Example 2 | | | | 96 | 0.80 | 2103 | 695 |
| Comparative Example 3 | | | | 97 | 0.82 | 2103 | 685 |

It can be understood from Table 1-1 and Table 1-2 that in samples of all Examples, $H_k$ at 120° C. is 700 kA/m or more, i.e., in the rare earth magnet obtained by the production method of the present disclosure (the rare earth magnet of the present disclosure), demagnetization could be suppressed.

On the other hand, in the sample of Comparative Example 1, the content ratio of the zinc component in the modifier powder is low and in turn, the coverage rate is low, as a result, demagnetization could not be suppressed. In samples of Comparative Examples 2 and 3, although the coverage rate is high, demagnetization could not be suppressed. The reason for this is considered to be that since $D_{50}$ of the SmFeN powder particles is large, the SmFeN powder particle has multiple magnetic domains and consequently, many magnetic domain walls which invite deterioration of the magnetic properties are present in the SmFeN powder particle.

In addition, it can be understood from FIG. 5 that compared with the sample of Comparative Example 1, in the sample of Example 1, magnetization gradually decreases, though the residual magnetization (magnetization when the magnetic field is 0) is slightly low. Also, it can be understood from FIGS. 6 and 7 that compared with the sample of Comparative Example 1, in the sample of Example 1, the region of darkest part is small, i.e., the gap area is small, and the coverage rate of the modified phase on the SmFeN powder particle is high.

From these results, the effects of the rare earth magnet of the present disclosure and the manufacturing method thereof could be confirmed.

REFERENCE SIGNS LIST

10 SmFeN Powder particles
20 Modified phase
22 Gap

The invention claimed is:

1. A production method of a rare earth magnet, comprising:

preparing a magnetic powder having a magnetic phase which contains Sm, Fe and N and at least partially has a crystal structure of either $Th_2Zn_{17}$ type or $Th_2Ni_{17}$ type, preparing a modifier powder containing at least either a metallic zinc or a zinc alloy, mixing the magnetic powder and the modifier powder to obtain a mixed powder, compression-molding the mixed powder in a magnetic field to obtain a magnetic-field molded body, pressure-sintering the magnetic-field molded body to obtain a sintered body, and heat-treating the sintered body, wherein $D_{50}$ of the magnetic powder is 1.50 μm or more and 3.00 μm or less, the content ratio of the zinc component in the modifier powder is 6 mass % or more and 30 mass % or less relative to the mixed powder, and the heat treatment is performed at 350° C. or more and 410° C. or less.

2. The production method of a rare earth magnet according to claim 1, wherein in the magnetic powder, the proportion of magnetic powder particles having a particle diameter of 1.00 μm or less to the total number of magnetic powder particles of the magnetic powder is 1.50% or less and the content ratio of the zinc component in the modifier powder is 6 mass % or more and 10 mass % or less relative to the mixed powder.

3. The production method of a rare earth magnet according to claim 1, wherein the sintered body is heat-treated until a Fe—Zn alloy phase is formed on 90% or more of the particle surface of the magnetic powder in the sintered body.

4. The production method of a rare earth magnet according to claim 1, wherein the heat treatment is performed at 350° C. or more and 400° C. or less.

5. The production method of a rare earth magnet according to claim 1, wherein the heat treatment is performed over 3 hours or more and 40 hours or less.

6. The production method of a rare earth magnet according to claim 1, wherein the magnetic-field molded body is pressure-sintered at a pressure of 200 MPa or more and 1,500 MPa or less and a temperature of 300° C. or more and 400° C. or less over 1 minute or more and 30 minutes or less.

* * * * *